March 1, 1960    R. MANNAIONI    2,926,366
SCREW THREAD CUTTING MACHINE
Filed June 25, 1958    13 Sheets-Sheet 1

INVENTOR:
RIGHETTO MANNAIONI
By
Richardson, David and Newton
ATTYS.

March 1, 1960  R. MANNAIONI  2,926,366
SCREW THREAD CUTTING MACHINE
Filed June 25, 1958  13 Sheets-Sheet 5

INVENTOR:
RIGHETTO MANNAIONI
By
Richardson, Davis and Nordon
Attys.

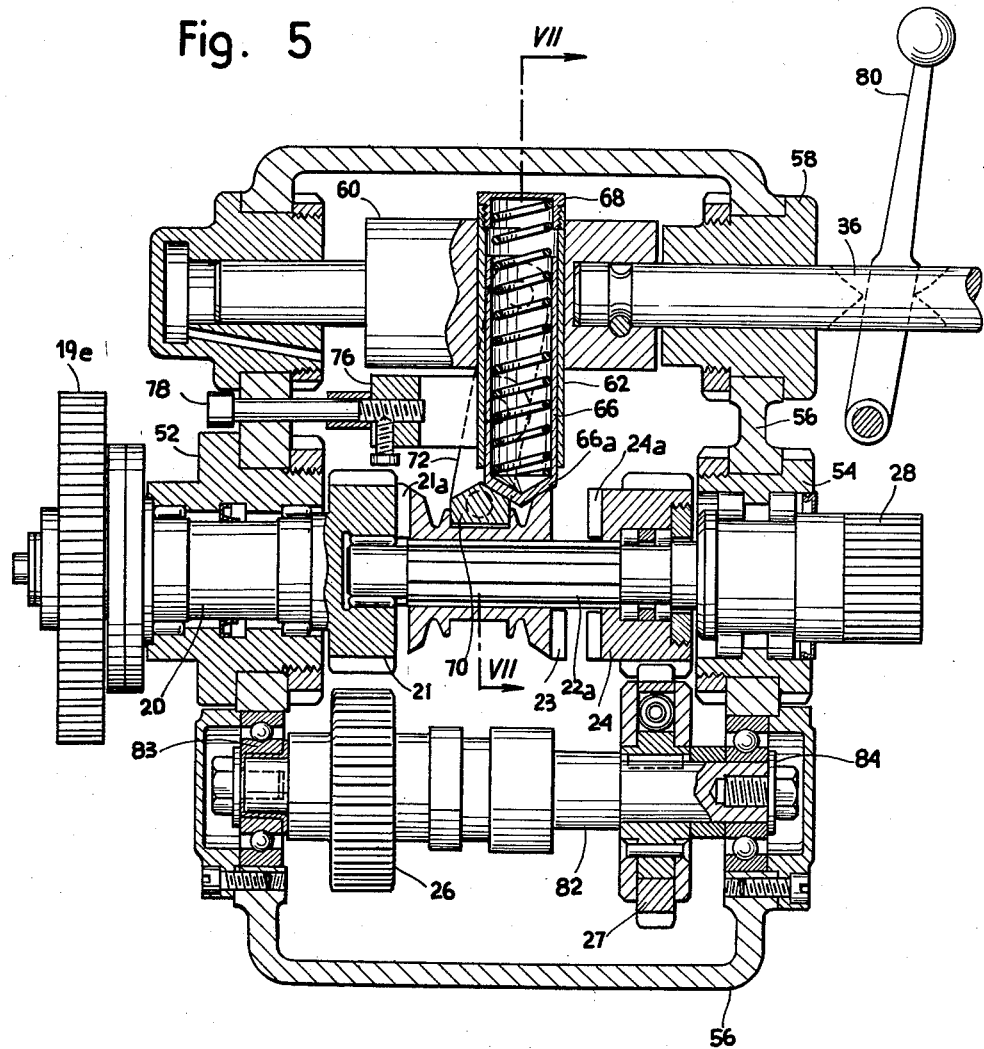

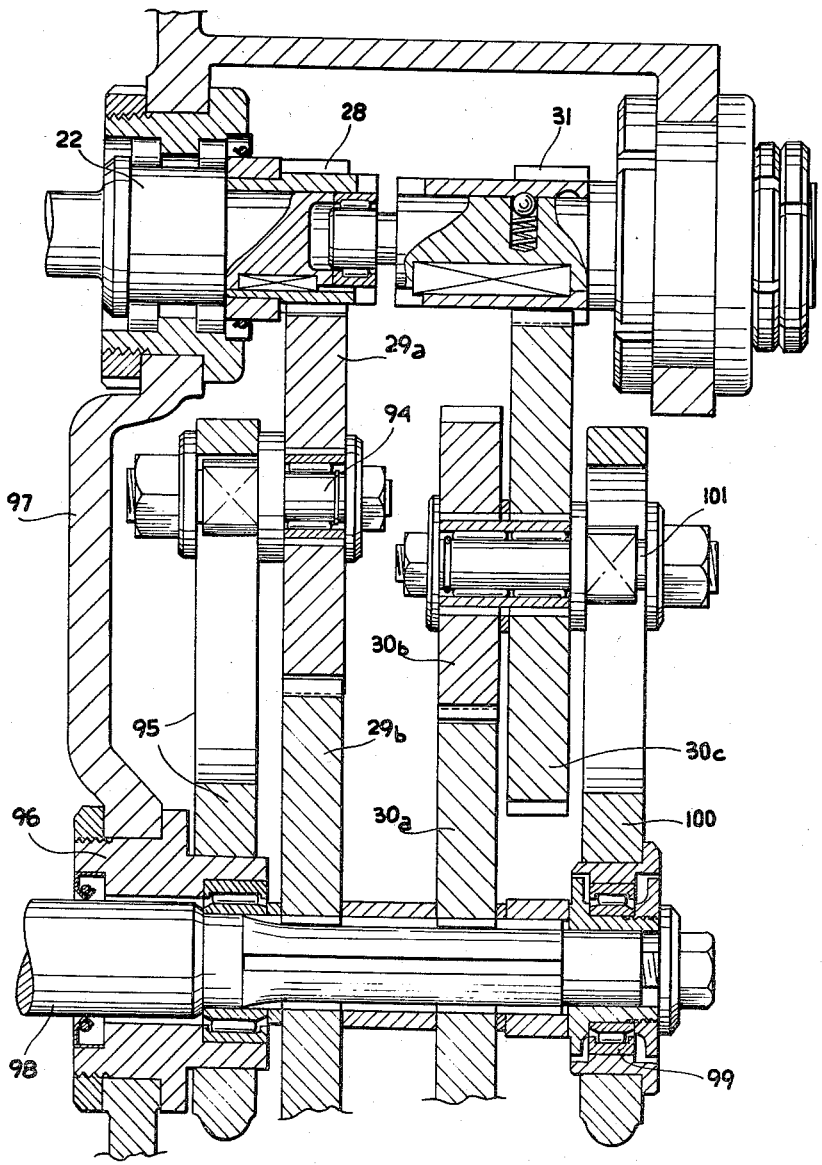

March 1, 1960 R. MANNAIONI 2,926,366
SCREW THREAD CUTTING MACHINE
Filed June 25, 1958 13 Sheets-Sheet 8

INVENTOR:
RIGHETTO MANNAIONI
By
Richardson, David and Newton
Atty's.

March 1, 1960 R. MANNAIONI 2,926,366
SCREW THREAD CUTTING MACHINE
Filed June 25, 1958 13 Sheets-Sheet 10

INVENTOR:
RIGHETTO MANNAIONI
By
Richardson, David and Newton
ATTYS.

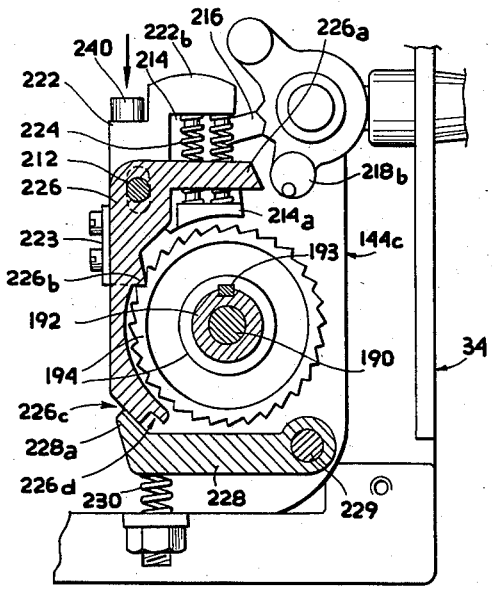
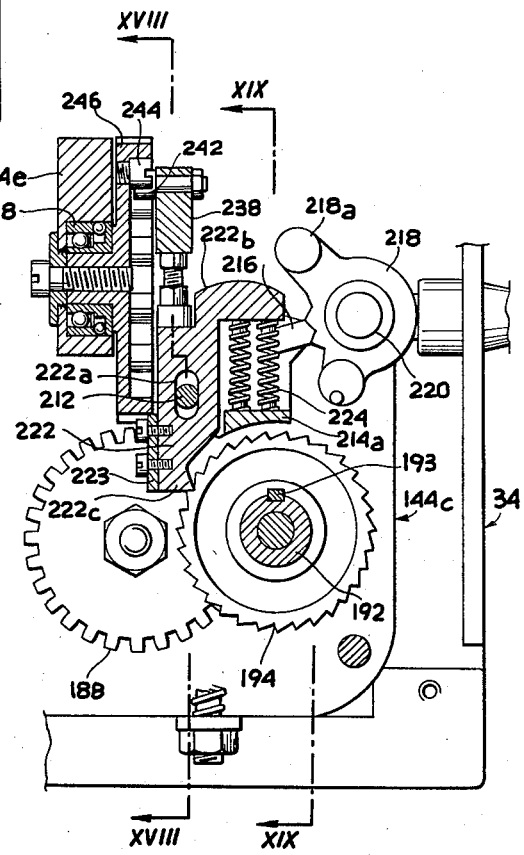
Fig. 15
Fig. 16

INVENTOR:
RIGHETTO MANNAIONI
By
Richardson, David and Nardon
ATTYS.

March 1, 1960  R. MANNAIONI  2,926,366
SCREW THREAD CUTTING MACHINE
Filed June 25, 1958  13 Sheets-Sheet 13

INVENTOR:
RIGHETTO MANNAIONI
By
Richardson, David and Nardon
ATTY'S.

2,926,366

SCREW THREAD CUTTING MACHINE

Righetto Mannaioni, Florence, Italy

Application June 25, 1958, Serial No. 744,585

Claims priority, application Italy June 25, 1952

6 Claims. (Cl. 10—105)

This invention relates to improvements in screw cutting machines for increasing the range of leadscrews therein. This application is a continuation-in-part of my copending application Ser. No. 362,099, filed June 16, 1953, now abandoned.

Lathes used for the formation of screw threads are well known. Such machines cyclically provide a working step, during which a tool removes the material from the workpiece being cut so as to form a thread, and a return step, during which a toolholder slide is brought back to its starting position. Usually, the motion of the toolholder slide is controlled by a leadscrew which is driven through gears by a spindle, and the reversal of the rotation of the leadscrew determines the reversal of the linear motion of the slide or carriage.

The reversal of rotation of the leadscrew is generally effected by means of a reversing coupling the input shaft of which is driven by a gear meshing with another gear integral with the spindle or chuck and there is a reduction drive between the output shaft of the reversing mechanism and the shaft of the leadscrew. The arrangement is such that the rotational speed of the reversing mechanism is equal to the rotational speed of the spindle. It is therefore necessary to reduce and keep the rotational speed of the spindle low in order not to damage the reversing mechanism operating during the rotation of the spindle. The reversing mechanism is stressed by the inertia of all the members which, through the turning of the spindle, reverse their direction of displacement. This leads to a marked limitation of the productive capacity of the machine.

A tool screw cutting machine has been designed wherein the reversing mechanism has been assembled with the output shaft coupled to a leadscrew having a large pitch. The reversing mechanism is driven by a plurality of gears which pick up the motion from the spindle or from a driving motor. This construction permits the rotational speed of the spindle to be kept high without any danger of damage to the reversing mechanism. In fact, the number of revolutions of the shaft of the leadscrew, and thus of the reversing mechanism, is much lower than the number of revolutions of the spindle or chuck and that is reduced exactly in accordance with the ratio between the leadscrew pitch and the pitch to be cut. It is therefore possible to have a high spindle speed during the reversing motion. By this arrangement the inertia of the rotating masses which reverse the direction of rotation are restricted, since the whole series of gears of the reduction drive between the spindle and the reversing mechanism, mounted on the leadscrew shaft, keeps the direction of rotation constant.

In order that the tool may return each time into the same previously-cut groove or thread, it is necessary that the leadscrew pitch should be a multiple of the pitch to be cut. The leadscrew allows relatively restricted threads with one start to be cut; for instance, it is possible to cut threads having pitches in millimeter submultiples of 30, with a 30 mm. pitch leadscrew. That is, it is possible to cut threads having the following pitches, in millimeters: 0.75; 1.0; 1.5; 2; 3 and so on. This leads to the necessity for changing the leadscrew often and of having a certain number of leadscrews in order to be able to produce threads having a sufficiently large range of threads with different pitches.

The present invention is related to screw cutting machines of the above mentioned type. One object of the invention is to eliminate the disadvantage of having to replace the leadscrew frequently.

A screw cutting machine, particularly of the automatic controlled type, according to the present invention, is characterized in that between the motion reversing mechanism and the leadscrew shaft, it includes a variable ratio drive of multiplication, or division. The arrangement of the reversing mechanism before the series of driving gears between the spindle and the leadscrew is unaltered, so that the number of revolutions of the reversing mechanism is always very low in relation to the number of revolutions of the leadscrew.

The drive between the reversing mechanism and the leadscrew includes a restricted number of gears, for instance, a gear on the output shaft of the reversing mechanism, a gear on the leadscrew shaft and gears meshing with these gears and integrally mounted on a transmission shaft. The drive may be varied in any suitable way; for instance, by the replacement of at least one of the mutually meshing pairs of gears.

By this means it is possible to arrange that the leadscrew, through the variations of the gear ratio between the reversing mechanism and the leadscrew, may be used to obtain threads having a larger number of different pitches, thus increasing the working possibilities with the same leadscrew. In fact, the replacement of a gear ratio by another between the reversing mechanism and the leadscrew, allows the same leadscrew to operate like two different leadscrews directly controlled by the reversing mechanism.

Moreover the machine according to the invention, allows forming simultaneously the multiple threads of multi-start screws. By having available two replaceable gear ratios, one before and the other after the motion reversal mechanism, it is possible to arrange some gear ratios so that the tool at each cut, instead of returning into the previous groove, is moved into a subsequent thread, therefore cutting alternately in two or more grooves. If the leadscrew is exactly a multiple of the pitch, the tool always returns into the thread. If on the contrary, when dividing the leadscrew pitch by the pitch to be cut, a remainder is obtained, the tool, instead of returning into the first thread groove, will describe a second thread groove spaced with respect to the first groove according to the value of the remainder, a third groove spaced from the second groove, and so on, until it will return again into the first groove to cut it deeper, and then return again into the second and third grooves and so on.

The machine, according to the invention, therefore has as another object provision of an assembly of devices designed to allow the feed of the tool at each cut or after any number of cuts for the forming of multi-start threads.

The machine also and advantageously includes a hydraulic system with automatic controls on the machine carriage for purpose of automatically obtaining the longitudinal motions of the toolpost carriage, the reciprocal transversal motions of the tool and the infeed motions of the tool after each cut.

The accompanying drawing illustrates, by way of example, two constructional forms of the invention.

Figure 3:
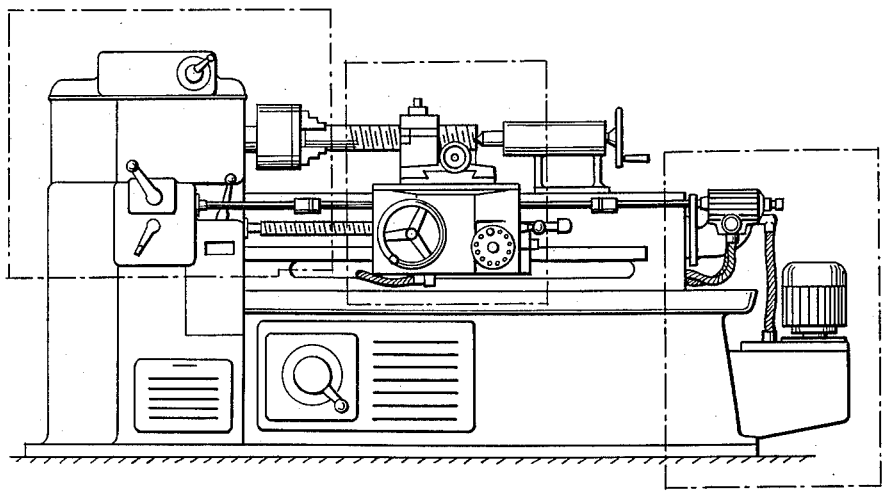
Fig. 3 shows an assembly of the machine according to the invention.
Figure 3A:
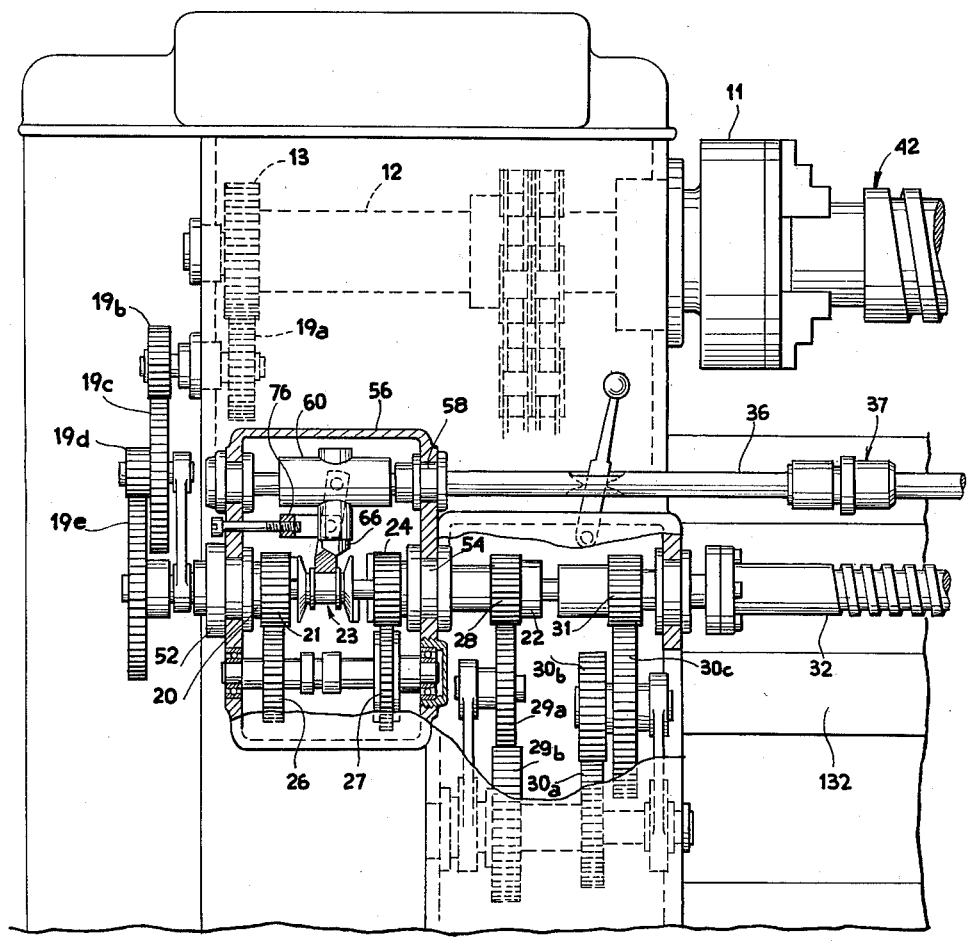
Figure 3B:
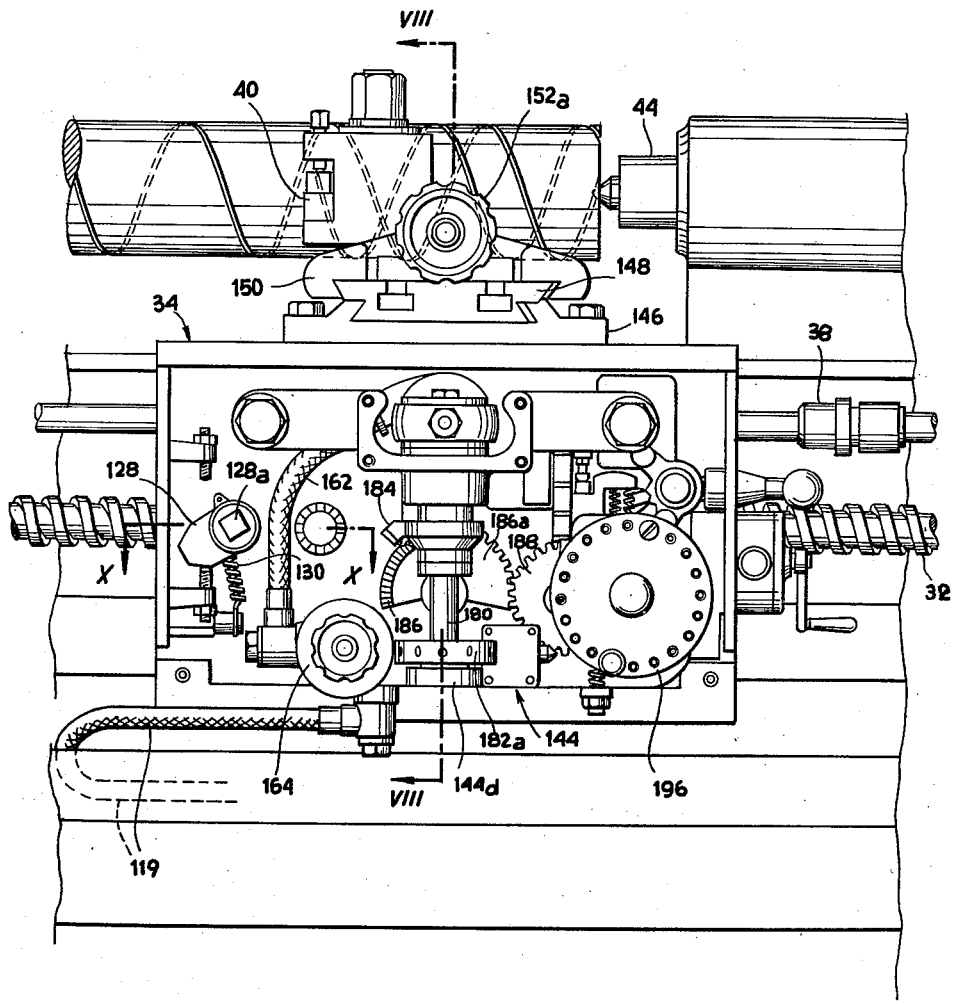
Figure 3C:
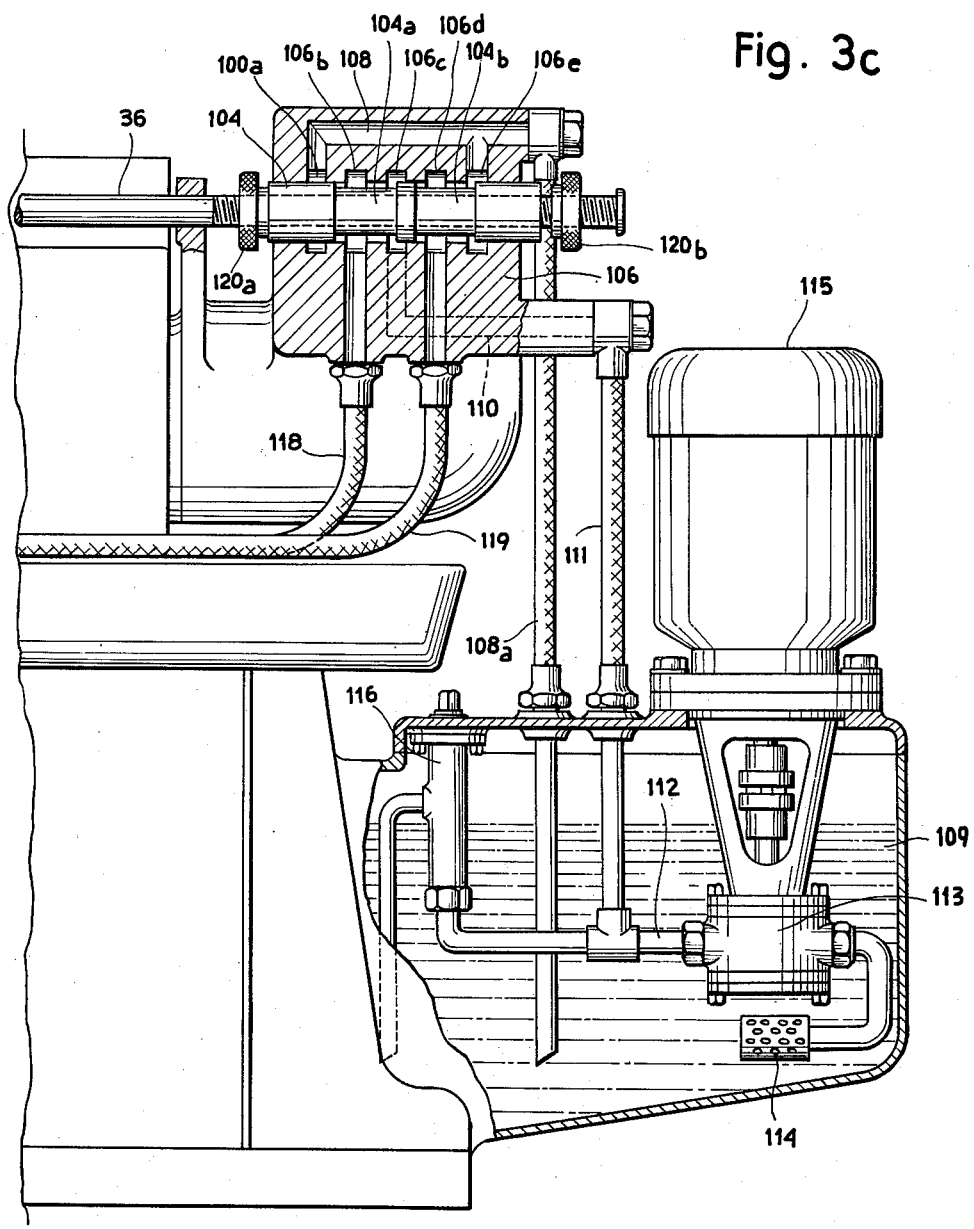

Figs. 3a, 3b, and 3c illustrate three different sections, as indicated in Fig. 3, of an elevation diagrammatic view of the assembly of the machine with some sectioned parts thereof.

Figure 4:
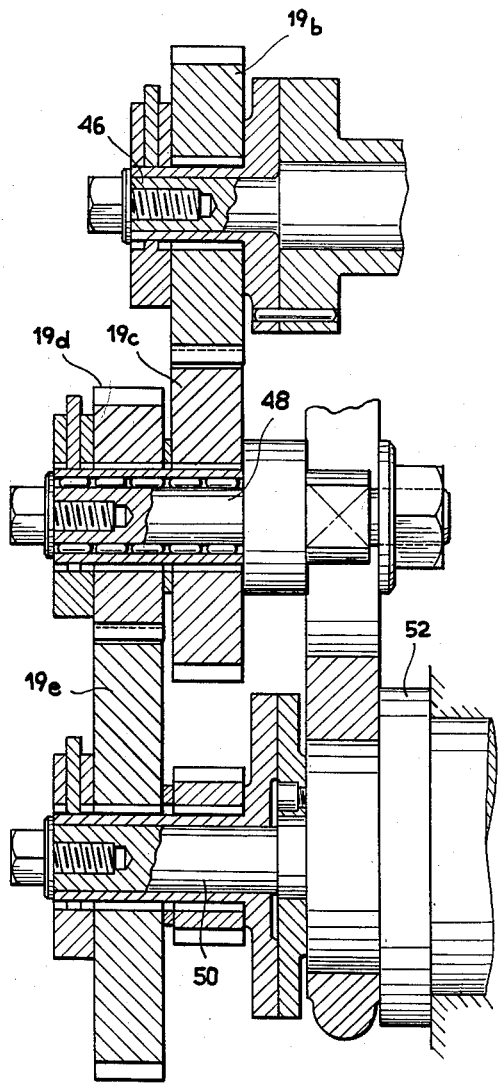

Figs. 4, 5 and 6 separately illustrate a first train of gears, a reversal mechanism and a second train of gears inserted between the spindle and a threaded bar.

Figure 7:
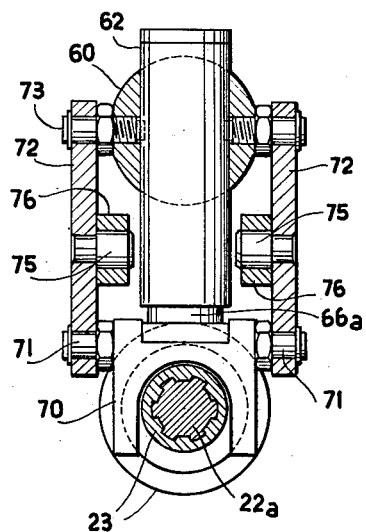

Fig. 7 is a local section taken along the line VII—VII of Fig. 5.

Figure 8:
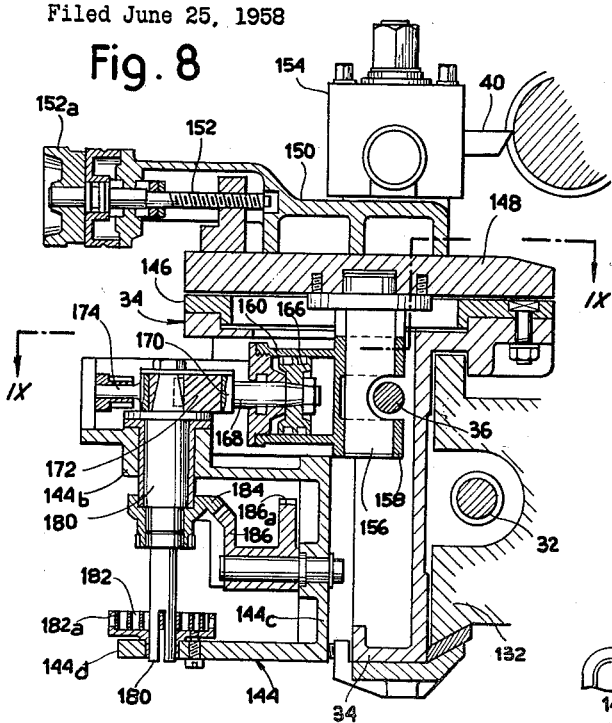

Fig. 8 illustrates a local section taken along the line VIII—VIII of Fig. 3b.

Figure 9:
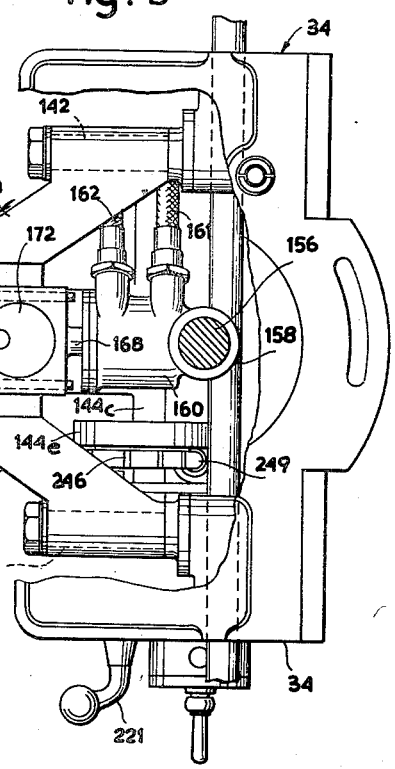

Fig. 9 illustrates a partial sectioned view taken along the line IX—IX of Fig. 8.

Figure 10:
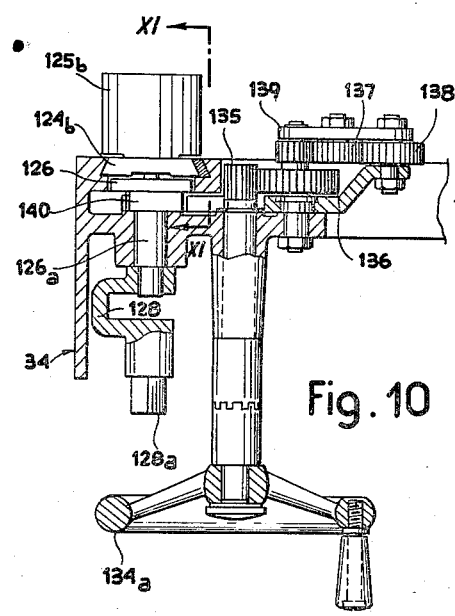

Fig. 10 illustrates a local section taken along the line X—X Fig. 3b.

Figure 11:
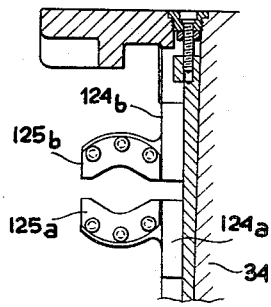

Fig. 11 is a view of a local section.

Figure 12:
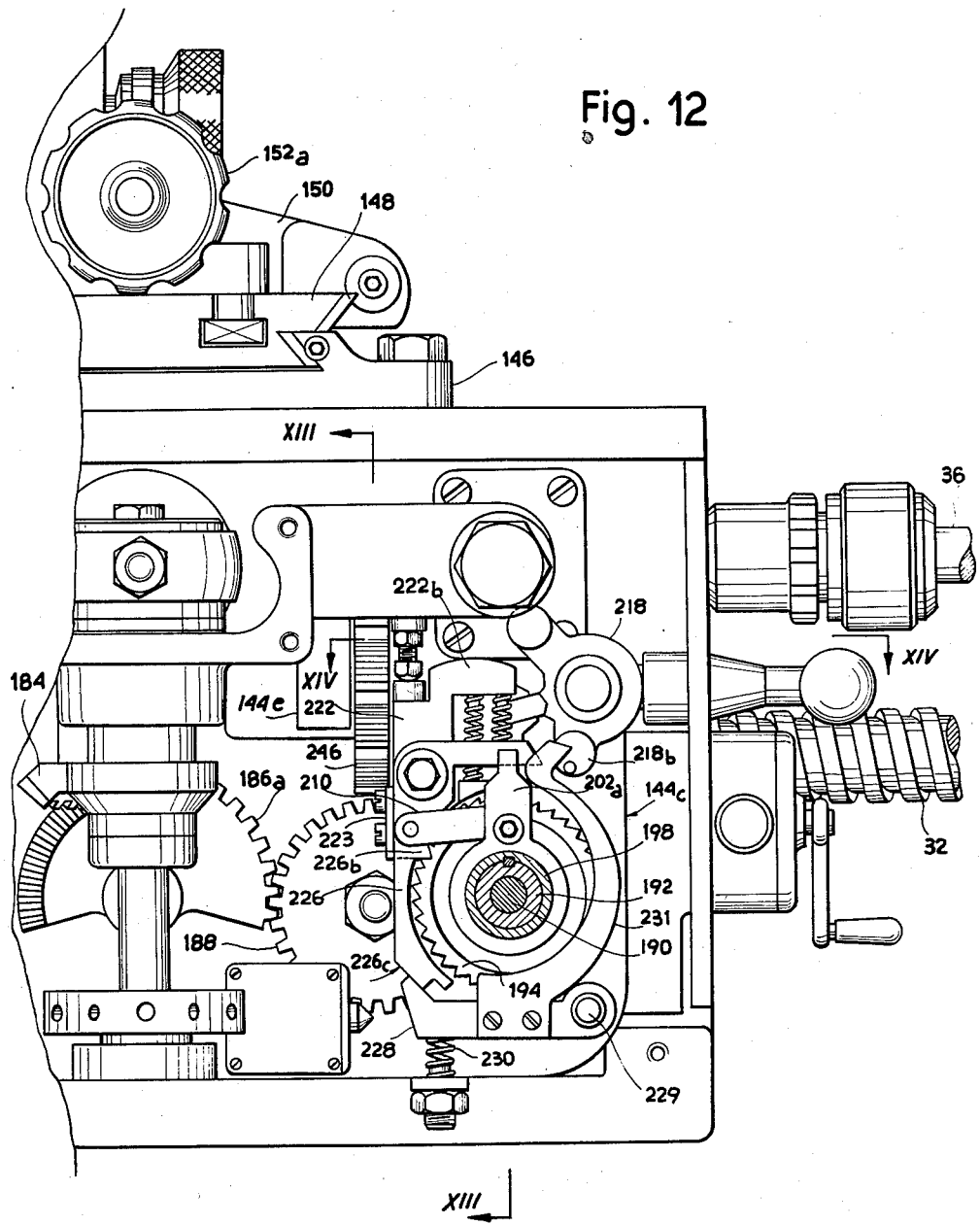

Fig. 12 illustrates an enlarged detail of Fig. 3b.

Figure 13:
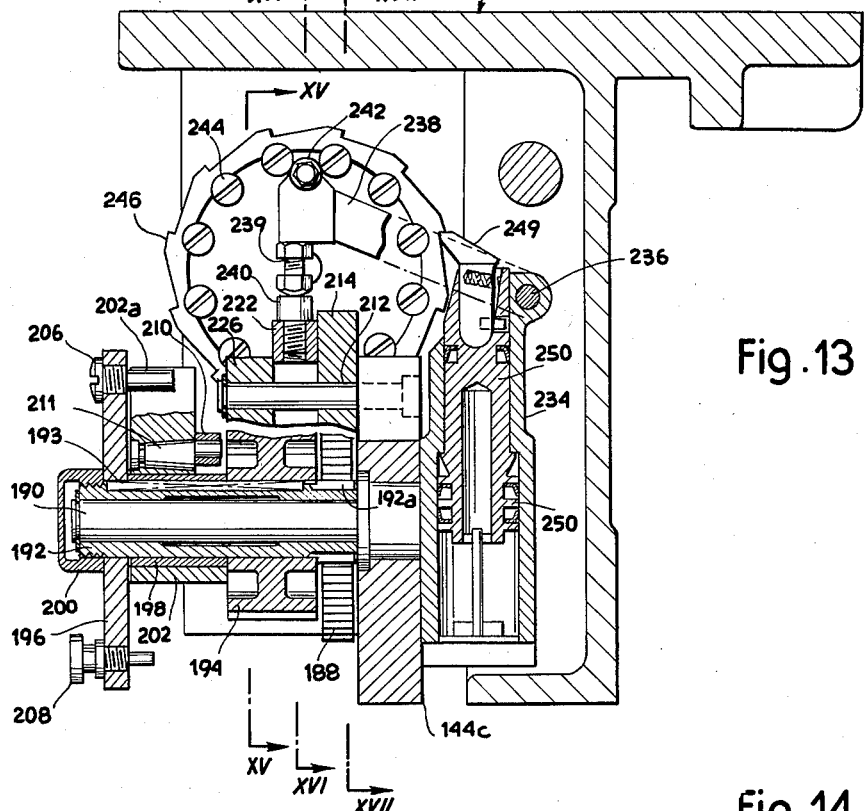
Figure 14:
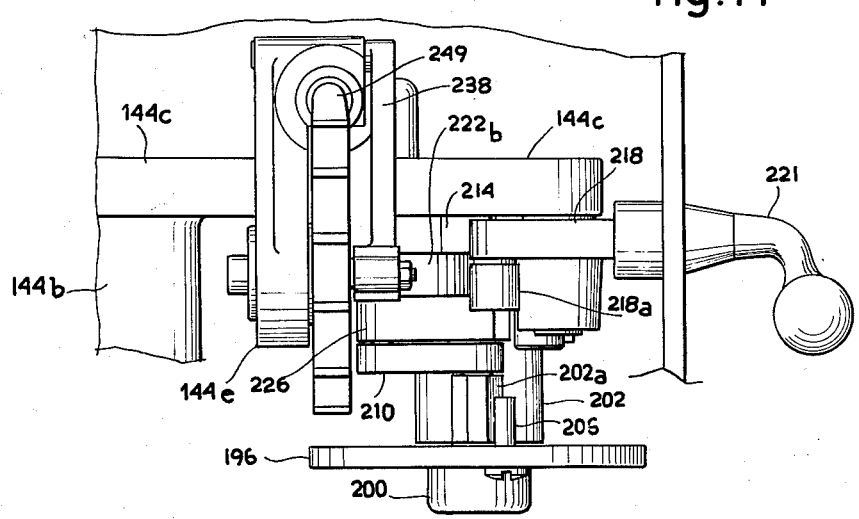

Figs. 13 and 14 illustrate two sections taken along the lines XIII—XIII and XIV—XIV of Fig. 12.

Figure 17:
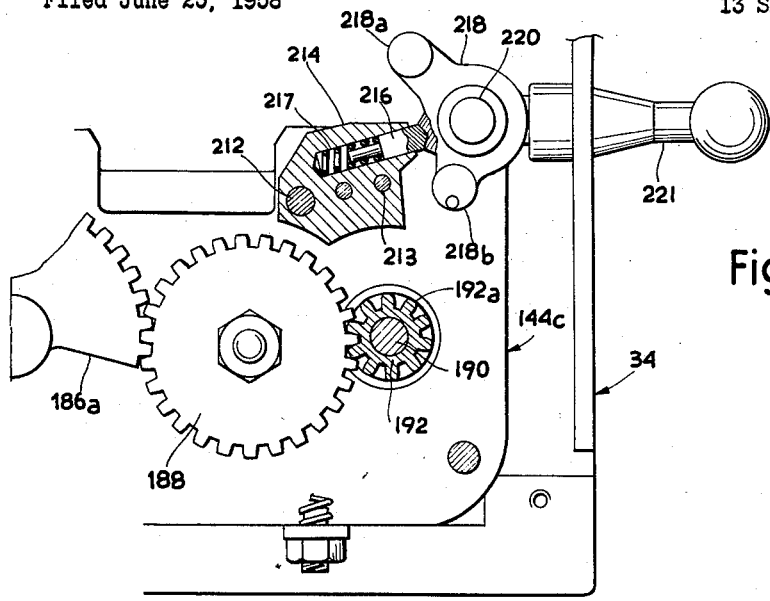

Figs. 15, 16 and 17 illustrate three sections taken along the lines XV—XV, XVI—XVI, and XVII—XVII of Fig. 13.

Figure 18:
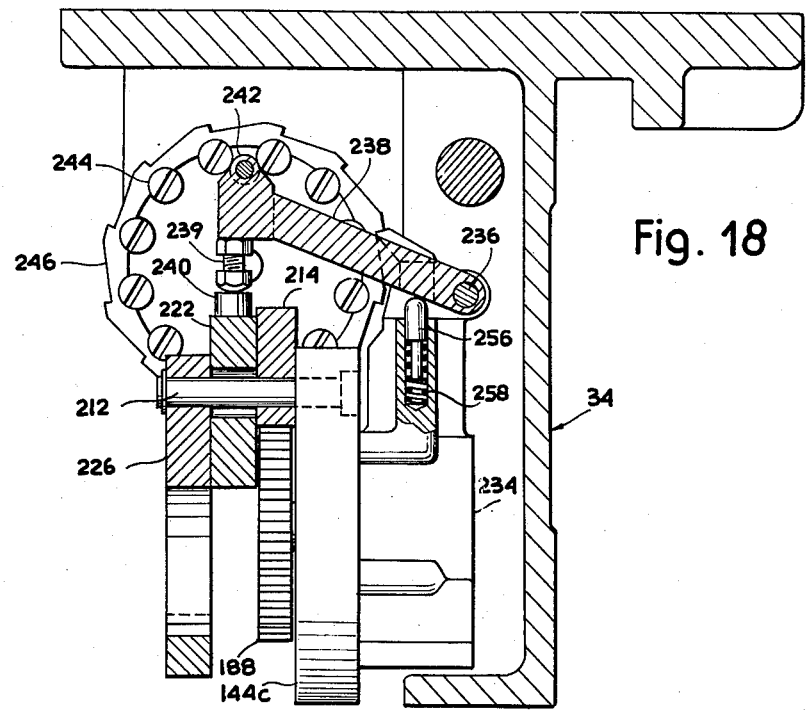
Figure 19:
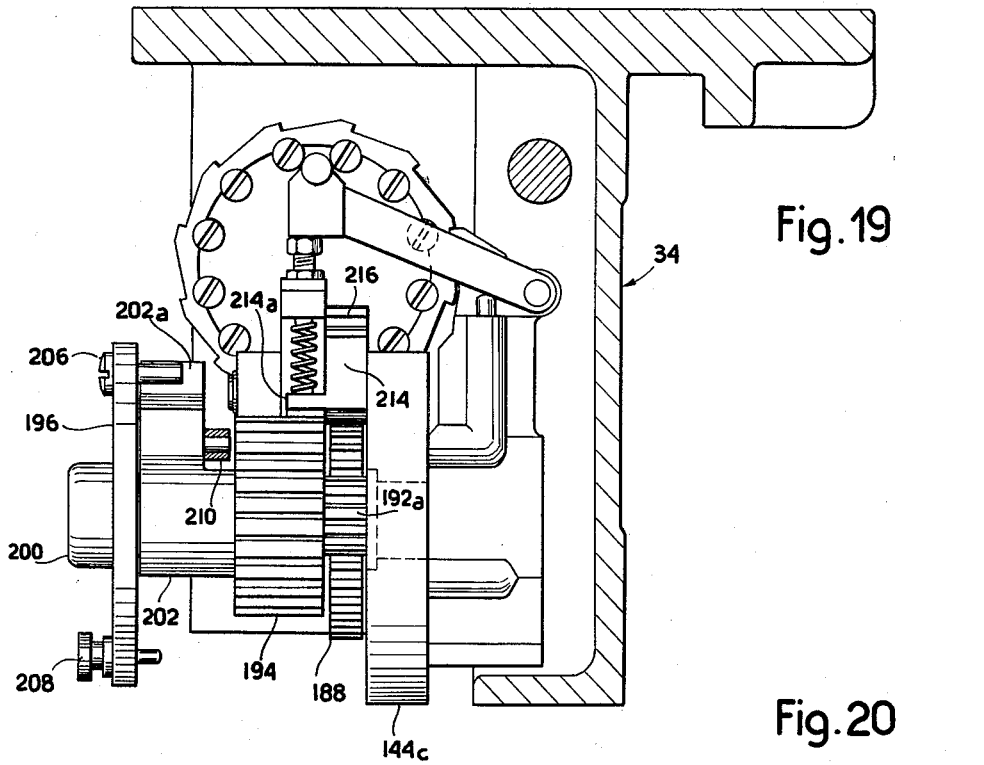

Figs. 18 and 19 illustrate two sections taken along the line XVIII—XVIII and XIX—XIX of Fig. 16.

Figure 20:
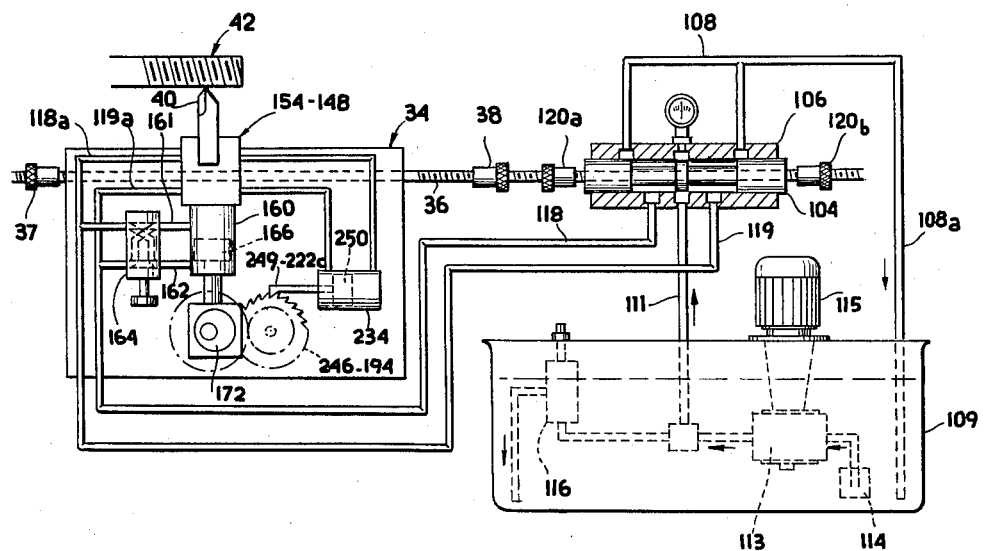

Fig. 20 illustrates a diagram of hydraulic circuits of the machine.

Figure 1:
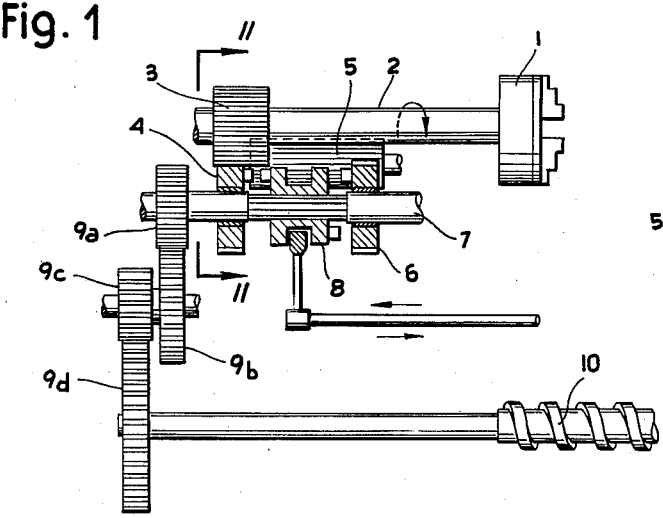
Fig. 1 shows one arrangement of a spindle-leadscrew drive.
Figure 2:
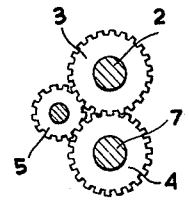
Fig. 2 is a diagrammatic view on the line II—II in Fig. 1.

In a known mechanism shown in Figs. 1 and 2, a chuck 1 is arranged on a spindle 2 on which there is also a pinion 3, directly meshing with a gear 4 and, through a transmission pinion 5, a gear 6. The gears 4 and 6 are loose on the same shaft 7. The gears 4 and 6 are alternatively coupled with the shaft 7 by a means of a sleeve 8, which forms part of a reversing clutch. A tooth or claw, provided on each end of the sleeve 8, co-operates with a tooth or claw on the gears 4 and 6 respectively. Through a train of gears 9a, 9b, 9c and 9d the shaft 7 transmits the motion of the shaft 2 with a definite gear ratio to a leadscrew 10. The gear ratio depends upon the pitch of the leadscrew and on the pitch of the thread to be cut. By this arrangement, the gears 4, 6 and 8 of the reversing mechanism rotate substantially at the same speed as the spindle. The reversal of the motion determines the reversal of the rotational motion of all the rotating masses. These masses have a marked inertia and include the gears 9a to 9d and all the members connected thereto. For this reason, the rotational speed of the spindle 2 must be kept low.

According to Fig. 3a, a chuck 11 is mounted on a spindle 12, through a pinion 13 splined on the spindle, controls the train of reduction gears 19a, 19b, 19c, 19d and 19e. Gear 19e is mounted on the reversing mechanism input shaft 20, and a gear 21 is integral with the shaft 20. The sleeve 23 of the reversing mechanism is slidable but rotatably fitted on a shaft 22 coaxial with the shaft 20. A second gear 24 is loosely arranged on the shaft 22 and receives its motion from the gear 21 through a train of gears 25, 26 and 27 which reverse the direction of the motion and multiply it in relation to the gear 21 for the return motion of the slide. The reversing mechanism sleeve 23 alternatively meshes, by means of a single tooth or claw on each of its ends, with a corresponding tooth or claw 21a on gear 21 or one of the two teeth or claws 24a on gear 24 as shown in Figs. 3a and 5. The reversing mechanism, which is made up of the gears 21 and 24 and the sleeve 23 is in fact actuated by a single pair of teeth or claws at each end, so that the relative angular engaging position, which is realized between the sleeve 23 and the gear 21, and between the sleeve 23 and the gear 24 is unique.

Instead of being directly coupled with the leadscrew, as shown in dotted lines in Fig. 3, the shaft 22 carries a gear 28, which transmits the motion, through gears 29a, 29b, 30a, 30b, 30c to a gear 31 carried by the leadscrew shaft 32.

The gear ratio of the gears 28, 29a, 29b, 30a, 30b, 30c and 31 may be varied by replacing a train of gears with another having a different gear ratio either for multiplication or of reduction of speed.

By the arrangement described above, it is possible to avoid the replacement of the leadscrew in many cases by changing all or some of the gears 28, 29a, 29b, 30a, 30b, 30c and 31 so as to vary the gear ratio. It is possible to obtain certain displacements of the carriage, such as those obtained by the replacement of the leadscrew, thus creating an "apparent leadscrew" having a virtual pitch, or multiple of the desired pitch to be cut. The tool will always get back into the started thread by means of the unique angular position which is obtained with the reversing mechanism. The ratios between the spindle and the reversing mechanism, and between the latter and the leadscrew must be such as to give the total ratio desired between the spindle and the leadscrew in accordance with the pitch of the thread to be cut.

When multi-start threads are to be cut, the pitch of the leadscrew must be varied by means of an appropriate ratio between the reversing mechanism and the leadscrew in order to preserve the condition that the quotient of the apparent pitch of the leadscrew divided by the pitch of the thread to be cut, provides a remainder equal to the pitch to be cut divided by the number of the starts.

For example, if it is required to cut a pitch of ¼" having two starts with a pitch between each thread of ⅛", the quotient between the apparent pitch of the leadscrew and the pitch of the thread to be cut should give ⅛ as a remainder. In this case, using the known systems, a ⅝" leadscrew is required, so that ⅝ divided by ¼ gives 4 with the remainder of ⅛. Therefore, it is possible to fix the gear ratio between the spindle and leadscrew on the basis of the pitch to be cut and the adopted leadscrew. At the first cut, the tool works in a groove having a pitch of ¼" and at the second cut, the tool, instead of penetrating into the previous groove, will decrease by ⅛", creating a new groove having a pitch of ¼" between the groove of a ¼" pitch previously generated. At the successive cut, still decreasing by ⅛" the tool will penetrate into the groove of the first cut and thus alternatively will penetrate once in one groove and then the other, until the multi-start thread is finished.

According to the invention, using for example, a real 1" pitch leadscrew on the machine, it will be possible to actuate an apparent ⅝" leadscrew by so selecting the gears 28, 29, 30 and 31 as to obtain a gear ratio of 9:8 between the shaft 22 and the leadscrew shaft 32. A gear ratio of 1:4.5 will be applied between the spindle 12 and the shaft 20 of the reversing mechanism in order that the product of the two ratios will result in a total ratio equal to the pitch to be cut, divided by the pitch of the assembled leadscrew. It is thus possible to trace threads having the pitch required, i.e.:

$$\frac{1}{4.5} \times \frac{9}{8} = \frac{1}{4}$$

equal to the ratio between the pitch to be cut, i.e. ¼", and the pitch of the assembled leadscrew, i.e., of 1".

A second example will be given for greater clarity. Assuming that it is required to cut a screw having a pitch of 12 millimeters with two starts, that is, a distance between each thread of 12:2=6 mm., it is necessary to provide an apparent leadscrew having a pitch multiple of 12 with a remainder of 6; for example, an apparent leadscrew with a pitch of 30 millimeters (30=12×2+6).

By using a leadscrew of 25.6 mm., (that is, nearly 1"), it is possible to actuate the necessary apparent leadscrew having a pitch of 30 mm., by supplying the gears 28 to 31 with a ratio 300:254, or 150:127. A ratio of 1:2.5 will be applied between the spindle and the reversing mechanism. In this way the product between the two ratios will provide a total product equal to the pitch to be cut divided by the pitch of assembled leadscrew (25.4 mm.). Thus:

$$\frac{1}{2.5} \times \frac{150}{127} = \frac{150}{317.5} = \frac{12}{25.4}$$

equal to the ratio between the pitch of the screw to be cut (12 mm.) and the pitch (25.4 mm.) of the assembled leadscrew.

In Figs. 3a, 3b and 3c, numeral 34 generically denotes the carriage which is engaged to the threaded bar 32 and is moved by the latter during the rotations. Numeral 36 indicates a control bar for the reversal device, which includes the sleeve member 23. Two stops 37 and 38 are adjustably mounted on said control bar. These stops are designed to define the stroke of the carriage 34 and can be adjusted as desired. The carriage 34 carries a slide which is moved transversally or in an inclined direction with respect to the axis of the chuck 11 to control the displacements of the tool. This tool cuts the workpiece 42 supported between the chuck 11 and the tailstock 44.

Fig. 4 illustrates the location of the gears 19a, 19b, 19c, 19d, 19e, which are designed to modify the pitch, in a more detailed manner. As shown in Fig. 14, these gears are mounted in a replaceable manner on the pins 46, 48 and 50, which are provided with suitable conventional rolling bearings. The pin 48 is mounted on an adjustable support of the so called quadrant type. The gears 19b to 19e may be appropriately replaced to obtain the desired results.

In Figs. 5 and 7, the reversal mechanism, of which the members 20 to 28 form a part is illustrated in a more detailed manner. According to Figs. 5 and 7, the shaft 20 and the shaft 22, aligned with each other, are mounted on rolling bushes 52 and 54 respectively carried by a box 56. The splined portion 22a of the shaft 22 is located, at the end, in a suitable housing of the end of the shaft 20. The splined portion 22a of the shaft 22 is designed to allow the slipping of the sleeve 23, which may be coupled to the sole front tooth 21a formed by the gear 21, or alternately to the front teeth 24a formed by the gear 24. In order to determine a tripping motion in the axial direction of the sleeve 23, there is provided a device directly actuated by the bar 36 which is moved in the axial direction when the carriage 34 reaches the adjustable stops 37 and 38 respectively. For this purpose, the control bar 36 penetrates through a bushing 58 into the box 56 and is engaged to a core 60 which forms a transversal hollow cylindrical guide by means of a casing 62 upperly closed by a cover 64. A hollow cylindrical member 66 slides in the casing 62 and said hollow member is downwardly stressed by a spring 68 in such a way that the pointed end 66a of the member 66 is caused to press against the upper pointed surface formed by the fork 70, which partially embraces the sleeve 23, becoming engaged in a groove thereof. The fork 70 is linked through the pins 71 (see Fig. 7) to the lower ends of two connecting rods 72 whose upper ends, through the pins 73, are linked to the core 60.

In an intermediate position, the connecting rods 72, by means of the pins 75, are linked to a fork member 76 connected to a stem 78 which passes through a hole of the box 56. Member 76 is guided in this hole to be able to slide at a freely adjustable rate between two end stops formed by said stem 78. Departing from the position illustrated in Fig. 5, when the bar 36 is moved by the carriage (or also manually by means of the lever 80) in the direction of the arrow f of Fig. 5, the displacement of the core 60 and thus of the wedge member 66 is initially determined in the same direction. This loads the spring 68, the assembly of the members 76—78 is moved by effect of the entraining determined by the connecting rods 72 always in the same direction of the arrow f. When the member 76 with the stem strikes against the box 56, and when the point 76a of the wedge member 66 exceeds the point of the fork member 70, the instantaneous release of the sleeve 23 in a reversed direction with respect to that of the arrow f is determined by effect of the spring 68. Thus the connecting rods 72 are rotated suddenly in a counterclockwise direction with respect to Fig. 5. Then the meshing is obtained in a reversed direction with respect to the previous one of the sleeve 23 (in the embodiment, from the member 21 to the member 24); also the core 60 is tripped in the direction coincident with the arrow f until it strikes against the box 56. By operating with the bar 36 a reversed motion with respect to that of the arrow f, a motion reversed with respect to that described by the cited members is obtained. Thus a tripping meshing of the sleeve 23 is obtained again with the gear 21.

The above defined gears 26 and 27 are mounted according to Fig. 5 on an intermediate shaft 82 supported through the bearings 83 and 84, by the box 56. The shaft 82 carries the gear 27, according to this embodiment, by means of a conventional spring drive flexible coupling. The gear 26 is operated through an intermediate not visible gear by the gear 21, to obtain the reversal of the rotational direction.

With further reference also to Fig. 6, the shaft 22, through the teeth 28, meshes the gear 29a which is mounted by means of an adjustable pin 94 carried by a quadrant member 95. Member 95 is mounted and angularly adjusted on a bushing 96 carried by a frame 97 located adjacent the frame 56. The bushing 96 is designed together with another not visible bushing to support a shaft 98 which in the overhanging portion thereof and projecting from the bushing 96 carries the gears 29b and 30a. By means of another bushing 99, the shaft 98 carries a quadrant member 100, angularly adjustable like the structure 95 around the geometrical axis of the shaft 98. Member 100 adjustably carries a pin 101 which is designed to carry the gears 30b and 30c. Both the gear 29a on the pin 94 and the gears 30b and 30c on the pin 101, besides the gears 29b and 30a on the shaft 98, are replaceable to obtain the desired results of the gear ratio between the shaft 22 and the threaded bar 32, which are aligned. The angular adjustment of the quadrant members 95 and 100 and the adjustment of the pins 94 and 101 respectively thereon serve to adapt the assembly of the drive to the several gears having different diameters, which are capable of being mounted.

The axially slidable control bar 36, at the end opposite to the connecting end with the core 60, is combined with an oil distributor for the hereinafter described purposes. Bar 36 is designed to operate a unit 104 which slidably operates in an appropriate housing cut in a block 106, supported by the machine frame. The unit 104 is cylindrical and forms two large grooves 104a and 104b. The seat in the block 106 is provided with spaced annular grooves 106a, 106b, 106c, 106d and 106e. The grooves 106a and 106e are connected to a conduit 108 which in turn is connected with a pipe 108a and with the liquid tank 109, forming an exhaust. The central groove 106c is connected with a conduit 110 and a pipe 111 to the delivery tube 112 of a pump 113 with the intake in the tank 109 through the filter 114 and which is driven, for instance, by a motor 115. An adjusting valve 116 allows obtaining a calibrated and adjustable pressure in the delivery pipe 112 and thus in the groove 106c. The excess of the liquid pumped by the pump 113 is discharged again in the tank 109. The two grooves 106b, 106d are connected to two flexible conduits 118 and 119, which reach the carriage 34 for the hereinafter described purposes. Moving the unit 104 by the bar 36, because of the grooves 104 and 104b, makes it possible to determine, in any instant, with minimum displacement, the feed of the pressurized fluid in the conduit 118 and an interruption of the communication of said conduit with the exhaust 108 (position illustrated in Fig. 3c). Meanwhile the conduit 119 is put in communication with the exhaust 108, or in the reversed position wherein the conduit 119 is fed and the conduit 118 is connected with the exhaust. All this is obtained with the closure and opening of the communication by effect of the corners of the grooves 104a and 104b and of the annular grooves 106a to 106e which mutually cooperate to form valves. The opening of the valves is extremely fast, owing to the amplitude of the peripheral development of the single circular corners. The bar 36 determines the entraining of the unit 104 through two adjustable stops 120a and 120b, in such a way that the displacement of the unit 104 occurs after a predetermined stroke of the bar 36. In this way, the adjustment of the start of the tool's withdrawal stroke and the adjustment of the start of the tool's re-positioning set-up are respectively determined. The cycle of the tool is determined by the changeover of the pressurized fluid feed from the conduit 118 to the conduit 119 and vice versa.

The carriage 34 will be described with reference to Figs. 8 to 19. The carriage 34 is provided (see Figs. 10 and 11) with ways for two slides 124a and 124b. The slides are integral to two halfnuts 125a and 125b respectively. The halfnuts are designed to embrace the threaded bar 32, as they are correspondingly threaded in such a way as to screw the carriage onto the threaded bar 32. The two slides 124a and 124b are operated to approach and separate from each other by any suitable means, for instance, by an eccentric 126. The eccentric may be operated by a lever which is engaged to the square section extension 128a of a gooseneck member 128 integral to the shaft 126a of the eccentric 126. A spring 130 resiliently assures one or the other of the positions of the member 128, which correspond to the coupling or releases of the halfnuts 125a and 125b with the threaded bar 32.

Under the conditions of the carriage released from the threaded bar 32, the carriage may be rapidly moved along the ways 132 (see Figs. 3a and 8) by means of a handwheel 134a. The handwheel is mounted on a shaft 135, meshing, with its own internal end teeth, with the gear 136. Gear 136 meshes in turn through the division gears 137 and 138 mounted on the double connecting rod 139 to mesh with a stationary rack. The double connecting rod 139 is pivoted on the axle of the handwheel and through an arm, is moved by an eccentric 140 integral with the eccentric 126 to interrupt the meshing of the gear 138 when the two halfnuts 125a and 125b are engaged to the threaded bar.

The carriage 34 as shown in Fig. 9 a pair of parallel horizontal pins 142, on which a structure 144 is engaged. This structure includes two arms 144a which are engaged to pins 142, a central core 144b extending towards the inner portion of the carriage 34 to be connected to a plate 144c. An orientable structure 146 is applied to the structure of the carriage 34. Structure 146 forms a sliding way for a slide 148. This slide 148, in turn, forms a sliding way for a structure 150, which is positionally adjustable with respect to the slide 148 through a threaded pin 152 operable by means of a knob 152a, in such a way as to approach or withdraw the turret 154. Turret 154 carries tool 40 and is borne by the structure 150 with respect to the workpiece such as the one indicated by numeral 42. A shaft 156, which is extended through an opening of the structure 146, is secured under the slide 148. An oscillatory sleeve member 158 is mounted on the shaft 156 and an outwardly projecting horizontal axis hydraulic cylinder 160 is integral to said oscillatory sleeve member. Two conduits 161—162 are connected to the cylinder 160. The conduits depart from a distribution cock generically indicated by numeral 164, where the two conduits 118 and 119 arrive. The cock 164 is designed to reverse the communication between the two conduits 118 and 119 and the two conduits 161, 162 or vice versa in order to arrange the machine for external or internal threads. The cock 164 is made in a known way and it is operated so as to assume the two positions as above mentioned. A plunger 166 slides in the cylinder 160 and is connected with the stem 168 to a bushing member 170 which forms a circular housing for an eccentric 172. A threaded pin 174 is also secured to the bushing member 170 and is designed to adjust the position of a yoke. Member 176 is provided with stems 178 which are guided in the member 160 and project therefrom to lie against the built in bottom of the cylinder 170, to adjust the tool's withdrawal stroke. The eccentric 172 is locked in an adjustable position at the upper end of a shaft 180 which is mounted on the portion 144b of the structure 144. The shaft 180, at the lower end, is integral to an end of a coil spring 182 which is housed in a casing 182a and is secured, at the opposite end, to said casing. The casing may be adjustably engaged to the bracket 144d of the structure 144. A bevel geared sector 184 is integral to the shaft 180. Sector 184 meshes with a corresponding bevel geared sector 186, which through a spur geared sector 186a meshes with a gear 188.

An overhanging pin 190 is mounted on the plate portion 144c of the structure 144 and is covered by a sleeve 192, forming the teeth 192a at the inner end next to the portion 144c. Teeth 192a allow the sleeve to mesh with the gear 188. By means of a key 193, the sleeve 192 is made integral to a very wide gear, having inclined teeth, 194 and to a removable disc 196 which is arranged at the outer end of the sleeve 192 and may be secured thereto through a tubular spacer 198 and a locking nut 200. A member 202, carrying an extension 202a in the position substantially overlying the pin 190, is freely mounted on the spacer sleeve 198. The disc 196 peripherally carries a plurality of holes, in one of which a threaded pin 206 is engaged. The pin by means of a stud extending behind the disc may contact the extension 202a of the member 202. Another pin 208 may be applied in one or the other of the holes according to the number of cuts which is automatically required for the cutting of a workpiece. This second pin is rearwardly projecting so as to contact extension 202a on the opposite side with respect to the pin 206. When the disc 196, displaced by trips, determines the contact of the pin 206 with the extension 202a, it will determine an angular displacement thereof. Consequently will also determine the displacement of a connecting rod 210 which is articulated with the pin 211 carried by the member 202, 202a and which connects said member to a pawl tooth hereinafter described.

A pin 212 is engaged on the wall 144c. A shaped member 214 is secured to the plate 144c by means of this pin and a number of gudgeons 213 (see Fig. 17). The shaped member forms a sliding seat for a pointed member 216 which is stressed by a spring 217 to emerge on the right hand side with respect to Fig. 17. The member 214 also forms a frontwardly projecting bracket 214a. The pin 216 cooperates with the corresponding profile of two points of a member 218. Member 218 is hinged at 220 to the plate 144c and may be operated by an outer lever 221 so as to bring the member 218 from an intermediate position illustrated in Figs. 15, 16 and 17 into a position wherein an extension 218a is lowered and into a position wherein an extension 218b is raised, respectively, for the purposes hereinafter described. The pin 212 is extended through a slot 222a formed by a member 222 which includes an upper extension 222b, lying over the bracket 214a and a lower pawl extension 222c. A small front extending plate 223 is secured to the pin 222. The springs 224 react between the bracket 214a and the extension 222b in such a way as to keep the member 222 raised to the extent allowed by the elongation of the slot 222a and to keep the tooth 222c against the teeth of the ratchet wheel 194. When the member 222 is downwardly moved against the action of the springs 224, it determines a feed of one trip of said gear 194. Also a member 226, besides the member 222, is engaged onto the pin 212 and said member 226 may only rotate around the pin 212. The member 226 is provided with an upper square extension 226a, having the end chamfered, against which the extension 218b acts. Member, moreover, is provided with a pawl tooth 226b almost in correspondence with the tooth 222c of the member 222. A lower lug of the member 226 forms a lower profile, made up of a sloped plane 226c and of a triangular recess 226d. The tooth end 228a of a lever member 228 may cooperate against the profile 226c, 226d. Lever 228 is pivoted at 229 to the plate 144c. The lever 228 is urged by a spring 230 against the profile 226c, 226d. In addition, the lever 228 carries an arcuate member 231 which at its upper end is located with respect to the extension 218b in such a way that by moving the member 218 in the clockwise direction, the displacement of the shaped member 231 is determined. The displacement is determined in such a way as to cause the lowering of the tooth 228a. Then the extension 218b may act on the shaped end 226a of the member 226 to raise the teeth 222c and 226b of the ratchet wheel 194. Under the conditions illustrated in the drawing, the lever 228 by means of the spring 230, urges the member 226 with the tooth 226b onto the gear 194. When the tooth of the lever 228 is located with respect to the recess 226d, the pawl tooth 226b is raised and does not accomplish the stopping action it is called to effect. It is to be noted that by effect of the small plate 223, any motion of the member 226 in the clockwise direction also determines a corresponding motion of the member 222 and in particular a raising of the tooth 222c from the ratchet wheel 194. The raising of the tooth 222c from the ratchet wheel 194 is opposed by the spring 224 and may be operated by the extension 218a through the counterclockwise rotation of the member 218, in addition to the hereinafter described manner.

The member 226 bears the end of the connecting rod 210 in an articulated way and said connecting rod, at the opposite end thereof, as already illustrated, is engaged to the extension 202a of the member 202. An angular displacement of the member 202 and 202a in the counterclockwise direction determines a raising of the member 226 and the tooth 226b from the ratchet wheel 194, and also a raising of the corresponding tooth 222c from gear 194.

An arm member 238 is pivoted in 236 on a block 234 which is rearwardly secured to the wall 144c. Arm member 238 bears, at its end a lower extension 239 which lies on a hub 240 borne by the member 222. A slight lowering of the arm 228 therefore determines the lowering of the member 222 against the action of the springs 224 and to the extent allowed by the slot for the pin 212. Consequently a feed of a trip of the ratchet wheel 194 is determined. The contact between the members 239 and 240 does not prevent the rotation of the member 222. In order to determine the cyclical lowerings of the arm 238, lateral roller 242 cooperates with the removable pins 244 which are peripherally attached on a ratchet wheel 246. Wheel 246 is mounted, through the bearings 248, on a support 144e which is formed by the member 234. The wheel 246 is provided with outer inclined teeth which cooperate with a pawl 249 which is oscillatorily carried by a plunger member 250 slidable in an appropriate housing acting as a cylinder machined in the body 234 secured to the plate member 144c. The plunger 250 is operated in the two directions by effect of a hydraulic control combined with the feed conduits 118 and 119, in such a way that the motion thereof is synchronized with the motion of the plunger 166 with respect to the cylinder 160 and always through the control of the distributor member. The distributor member includes the unit 104 operated by the bar 36. During the raising of the plunger 250, the pawl 249 trips the wheel 246 once, whereby the arm 238 is lowered should the roller 242 meet a pin 244 during the displacement of the wheel 246. For each trip of the ratchet wheel 246, the roller 242 meets one pin 244, whereby the member 222 is lowered once like a pawl device for the tripping feed of the ratchet wheel 194. A pin 256 (see Fig. 18), resiliently urged by a spring 258 housed in the block 254, is designed to push the arm 238 in such a way as to bring the pin 242 always upwardly to contact the pins 244 of the ratchet wheel 246.

The operation of the last cited devices will now be described. When bar 36 is moved for the contact occurring between the carriage and the stop 38 at the end of the return stroke of the tool 40, the unit 104 is moved by the corresponding stop 120a from the position of balance in such a way as to change the feed of the pressurized fluid to the conduit 118 from the conduit 119. For instance, under the conditions of the diagram of Fig. 20, when the unit 104 is moved towards the right hand side looking at Fig. 20, the distributor 104 is moved in such a way that the conduit 111 is put in communication with the conduit 118. Thus the conduit 161 is fed to produce pressure in the corresponding chamber between the plunger 166 and the cylinder 160 to approach the tool. The conduit 162, through the conduit 119, is put in the exhaust conditions, that is, it is put in communication with the conduit 108, 108a. Under these conditions, a displacement of the cylinder 160 occurs and toolpost slide 40 approaches the workpiece being machined. Simultaneously, through the conduit indicated in Fig. 20 by 118a the cylinder-plunger system 234, 250 is fed to determine the raising of the pawl 249. A displacement of the bar 36 allows the approach of the tool 40 to the workpiece to be cut and allows the raising of the pawl 249. Simultaneously, as for what has previously been described, the reversal device operating the geared sleeve 23 has determined, through the tripping, the motion reversal of the threaded bar 32. Thus the carriage is moved in the direction reversed with respect to the previous one and advantageously with a speed reduced with respect to that obtained with the motion multiplication drive system provided by the gears 25, 26, 27, 24. At the end of the carriage working stroke, the bar 36 is moved in the reversed direction, and in this way, simultaneously at the new reversal of the reversing mechanism. At the new reversal of the motion of the carriage 34, the displacement of the unit 104 of the distributor towards the left hand side, according to Fig. 20, is determined. Consequently, the feed of the conduit 119 and the exhaust from the conduit 118 is determined. The conduit 162 is fed on one side and this determines a displacement of the tool 40 in the direction of the withdrawal with respect to the workpiece to be cut 42. Simultaneously the pressurized fluid reaches, through the conduit indicated in Fig. 20 by 119a, the cylinder-plunger system 250, 234. In this manner, the lowering of the pawl 249, which has previously been raised, i.e. at the start of the working step, is obtained. The raising of the pawl 249 determines the rotation of a trip of the ratchet wheel 246. This determines, in event of the presence of a pin 244, the lowering of the arm 238 and the lowering of the member 222, the feed of a trip of the ratchet wheel 194. Thus tripping feed determines, on one hand, the rotation of a corresponding trip of the disc 196 and an approach of the pin 206, from left to right in the counterclockwise direction, to the extension 202a of the member 202. On the other hand, the rotation of the shaft 180, through the gear 192a, the geared wheel 188, the sector 186a, the sector 186, and the sector 184, is determined. Consequently the rotation of one trip of the eccentric 172 is caused. This determines a displacement of the assembly of the plunger 166 so that the cylinder 160 is moved (and therewith, the slide and the toolpost 154) in the approach stroke of the tool 40 to the workpiece 42. In this way, an increment of the tool 40 is obtained to determine a new cut and thus the forming of a new chip. According to the position of the eccentric 172, the trips thereof having the same angular amplitude determine a increasingly smaller increment near the end of the cutting.

It is to be noted that if the communication is reversed, through the reversing cock 164, between the conduits 161 and 162 with respect to the conduits 118 and 119, the motion fo the tool is obtained in a reversed direction. This serves to effect, under one condition, the external threads, and under the other condition, the internal threads with the same machine and the increment system remains unaltered. It is to be noted also that, if during a trip of the ratchet wheel 246, a pin 244, acting on the pin 242, is missing, the approach motion of the tool is obtained without any increment because no trip of the ratchet wheel 194 occurs. This is used when multi-start screws (according to the above stated principles) are made and the various threads being successively cut by the tool. The tool effects, for instance, for a two start screw, two strokes in the same position to cut the same chip on the two threads being formed, before determining the traverse of the tool to operate, during other two successive cuts, the removal of another similar chip successively in the two threads being formed. All the pins 244 allow cutting the one start screws. By removing some pins 244, it is possible to obtain the simultaneous cutting of multi-start threadings. In particular in the two starts screws, one pin and not the other one is located and two not, and so on, according to the machine operational conditions.

The number of the cuts for the machining of a thread, is determined by the mutual position of the pin 206 and of the pin 208 carried by the disc 196 rotating by trips with the ratchet wheel 194. Departing from the position wherein the pin 208 is side by side and on the left of the extension 202a (looking at the figures of the drawing), the several cuts in the thread or in each thread are determined. At the end of each of said cuts, the disc 196 trips once whereby the pin 206 progressively approaches the extension 202a. When the pin 206 contacts the extension 202a, the entraining thereof occurs. Consequently, through the connecting rod 210, the displacement of the member 226 occurs and thus through the fin 223, the displacement of the member 222. This determines the raising of the teeth 222c and 226b from the ratchet wheel 194. At this moment, spring 182 which has been previously loaded and is loaded more through the tripping rotation of the assembly of the members 194, 188, 184 and 180, determines the fast reversed rotation of eccentric 172, shaft 180, ratchet wheel 194 and disc 196. During this fast motion in the reversed direction with respect to that effected by the trips, the teeth 222c and 226b are kept raised. This is effected by the detent that the lever tooth 228 operates on the member 226, owing to the trip thereof in the recess 226d. The trip operates to keep the assembly of the teeth raised and to allow the rotation of the wheel 194. At the end of this fast return rotation the pin 208 strikes against the extension 202a imparting a slight motion in the clockwise direction. This determines, on one hand, the new lowering of the teeth 226b and 222c on the ratchet wheel 194 through the connecting rod 210, and on the other hand, the return of the teeth of the lever 228 into the position illustrated in the drawing. Also the machine is stopped. The stopping action is caused by operation of an appropriate micro-switch controlled by the displacement of the member 226. In this way all the members return to the initial condition whereby it is possible to start a cutting on another workpiece with the same procedure under which the previous workpiece has been cut.

In order to effect a tripping displacement of the wheel 194, and thus an infeed of the tool, independently of the automatic controls determined by the carriage, it is possible to act on the member 218 in such a way that the extension 218a acts on the upper extension 222b of the member 222. This determines lowering of member 222 against the action of the spring 224, and in replacement of the action obtained by the tappet of the arm 238. A zero return, independently upon the completion of the machine operational cycle, may be obtained by acting on the member 218 in a reversed direction with respect to the previous one. This is accomplished in such a way that the extension 218b is actuated on the shaped member 231, on the lever 228, and through the shaped profile of the arm end 226a of the member 226 on member 226, to raise the teeth 226b and 222c from the ratchet wheel 194.

Threading lathes provided with a threaded bar controllable through a motion reversal mechanism driven by the main shaft and through a reduction drive have been known for a long time. Therein, the reversal clutch is actuated by a single tooth clutch so that the threaded bar is always dragged in the same angular position and always exactly enters into the thread again. The clutch is located in front of the drive gears and rotates at the same rotational speed as the piece-carrier chuck. By this arrangement, it is possible to thread with the same threaded bar any screw having a desired pitch, by modifying the drive between the reversal mechanism and the bar. But with this arrangement, there are the following essential disadvantages:

(a) The direction of rotation of the drive gears must also be reversed, through the motion reversal mechanism.

(b) The rotational speed of the chuck must be relatively low, so that the engaging clutch tooth and the teeth of gears are not damaged when they are reversed, owing to the impact stress which takes place thereon.

(c) This restriction of the rotational speed of the chuck prevents the use of the high cutting speeds by the tool and thus restricts its working capacity.

These disadvantages ar substantially eliminated in my invention (see Fig. 3a) by arranging the reversal clutch 21, 23, 24 between the drive gears 13, 19a, 19b, 19c, 19d, 19e, and the threaded bar splined on the shaft 22 instead of the clutch being located between the gears and the chuck 12. The reversal clutch or coupling is directly connected with the threaded bar which determines the longitudinal to and fro motion of the tool-holder slide. The input shaft 20 of the reversal clutch is driven through the drive gears 19a, 19b, 19c, 19d, 19e by whose aid the rotational speed of the reversal mechanism shaft 22 is modified and in particular reduced with respect to the speed of the same chuck, in relation to the pitch of the threaded bar and of the pitch of the thread to be cut.

The consequent advantage is that, notwithstanding the fact that workpiece chuck 11, 12, is provided with a high rotational speed, it is possible to keep the speed of the reversal clutch 21, 23, 24 relatively low, so that the tooth of said clutch is not exposed, when being meshed, to unduly heavy stresses. In addition, there are no rotating parts to be reversed, except the threaded bar, and therefore there is no high inertia to be overcome.

By this last arrangement, the threaded bar 22 has mandatorily a pitch which is a multiple of the pitch to be cut, so that the tool will always re-enter in the same thread. This is another requirement in addition to that of having the reversal clutch provided with a single tooth, that is, with a single meshing angular position.

For example, with the 1' threaded bar it is possible to cut any whole number of threads per inch, such as 4, 6, 8, 9, 10 etc. However, it is necessary to replace the leadscrew when less than a whole number of threads per inch is to be cut. For example, a leadscrew provided with a ⅝ of an inch pitch is necessary in order to cut 4½ threads per inch, with the ratio 1 to 4.

The disadvantage of the frequent replacement of the bar is substantially eliminated, according to my invention, owing to the fact that by the provision of a ratio located after the clutch or coupling a modification of the pitch of the threaded bar is effected without having to effect a replacement and always preserving the advantages obtained with the previous arrangement.

In order to clarify the invention concept, the previous numerical example is considered again. In that case, it was necessary to replace the threaded bar 22 of 1″ with the ⅝″ threaded one for the cutting of 4½ threads per inch, with a gear drive ratio to 1+4. With a system according to the present invention, which also provides the gear ratio 28, 29a, 29b, 30a, 30b, 30c, 31 and a threaded bar 32, it is sufficient:

(1) To leave the 1″ pitch threaded bar assembled;
(2) To arrange a 1+4 ratio in the gear drive 19 between the chuck and the clutch;
(3) To actuate a 8+9 ratio in the gear drive 28 to 31 between the clutch and the threaded bar.

The threaded bar 32 provided with a 1″ pitch is thus apparently a multiple of the pitch to which 4½ threads per inch corresponds, allowing the tool to re-enter in the previous groove at every cut. In other words, the bar 32 driven by the gear ratios 28 to 31 acts the same as a ⅝″ pitch bar directly inserted on the shaft 22. Therefore, actuation of an arrangement with the members 28 to 32 which is the equivalent of an arrangement provided by locating integrally a ⅝″ threaded bar on the shaft 22, is effected. The condition of having the apparent threaded bar 22 a multiple of the pitch to be cut, is met.

The gears of this second ratio 28 to 31 are subjected to forces to reverse the rotational direction during the reversal of the threaded bar, but owing to their low angular speed (in the embodiment considered as 4 times lower than that of the chuck), the gears are not subjected to very heavy stresses.

If the 1″ threaded bar is designed to cut 2, 4, 6, 8 threads per inch, it is sufficient to arrange a 1+1 ratio in the drive gears 28 to 31 and effect the desired reduction in the drive gears 19a, 19b, 19c, 19d, 19e.

The invention has also an application for the making and cutting of multi-starts screws. In this case, the pitch of the apparent threaded bar 22 must be varied through a suitable ratio between the reversal mechanism and the threaded bar, so that the quotient of the pitch of the threaded bar divided by the pitch to be cut gives a remainder equal to the pitch to be cut divided by the number of starts.

For example, we have to execute a ¼″ pitch with 2 starts, that is, two threads of ¼″ pitch and with a distance between the threads of ⅛″. The quotient between the apparent pitch of the threaded bar assembled on the shaft 22 and the pitch to be cut should give a remainder of ⅛ (¼+2=⅛). Therefore, provision of an apparent threaded bar of ⅝ inches (carried by the shaft 22) would be necessary in order that ⅝ divided by ¼ will result in 4 with a remainder of ⅛. At the first cut, the tool will define the ¼ pitch; at the second cut, the tool, instead of re-entering into the previous groove, will define a ⅛″ pitch thus generating a new groove in the middle of the ¼″ pitch, which it had previously generated. At the next cut, by defining another ⅛″, it will re-enter into the groove of the first cut; consequently the tool alternatively enters once in one groove and then in the other groove, until the multiple threading is completed.

With my invention, the replacement of the apparent threaded bar 22 is avoided, by leaving, for example a 1″ threaded bar assembled on the machine. Instead of such replacement the function of the apparent ⅝″ threaded bar 22 is actuated by the execution of a 9+8 ratio on the drive gears 28 to 31 between the reversal mechanism 21, 23, 24 and the bar 32. A 1+4.5 ratio will be applied between the chuck and the reversal mechanism so that the product between the two ratios will give a total ratio equal to the pitch to be cut divided by the threaded bar pitch 32, which is actually assembled. In fact, $$\frac{1}{4.5}+\frac{9}{8}=\frac{1}{4}$$

is equal to the ratio between the ¼″ pitch to be cut and the pitch of the 1″ threaded bar.

What I claim is:

1. A screw cutting machine including: a rotary spindle; a chuck secured to the spindle; a leadscrew for the control of the tool carriage; a reversal mechanism to reverse the direction of motion of the leadscrew, including an input shaft, an output shaft, a slidably keyed sleeve on said output shaft, a first single tooth on one end of the sleeve and a second single tooth on the other end of the sleeve, a pointer on said sleeve cooperating with a movable pointed member to operate the tripping slipping of said sleeve, a gear integral to said input shaft and provided with a single tooth to cooperate with the first single tooth on the sleeve, a free gear on said output shaft and provided with teeth to cooperate with the second single tooth on the sleeve, and a train of gears between said two gears; a train of gears replaceable between said spindle and said input shaft of the reversal mechanism, including at least a pair of gears replaceably mounted on an overhanging shaft in an adjustable positional way on a quadrant support, one of said gears of the pair meshing a replaceable gear driven by the spindle, and the other of said gears of the pair meshing a replaceable gear mounted on said input shaft of the reversal mechanism; a train of replaceable gears located between the output shaft of the reversal mechanism and the leadscrew, including a gear secured to said output shaft, a gear secured to the leadscrew, an intermediate shaft, two replaceable gears mounted and spaced on said intermediate shaft, overhanging shafts independently and positionally adjusted on two respective quadrant supports, a replaceable gear on one of said overhanging shafts to mesh said gear on the output shaft of the reversal mechanism and one of said gears on the intermediate shaft, a pair of replaceable gears mounted on the other overhanging shaft meshing said gear on the leadscrew and the other gear on the intermediate shaft; a carriage with a toolpost slide, slidable on longitudinal ways, and coupled to said leadscrew; a control bar co-extending with said leadscrew, axially slidable and carrying adjustable stops cooperating with said carriage at the end of the stroke, said bar forming an end core with a transversal sliding guide for said pointed member; said core being connected with said sleeve of the reversal mechanism through articulated connecting rods, restrictedly movable in the central zone; a hydraulic distributor device controlled by said control bar to change the fluid feed to one or to the other of two flexible conduits connected to the carriage; on the carriage a hydraulic device for the reciprocal control of the toolpost slide, including a two-members-cylinder-plunger system reciprocally fed by said two conduits, one of said members being integral to the slide and the other being engaged to a rotary tripping eccentric, a tripping displacement device of said eccentric including a ratchet wheel operating said eccentric, a feed pawl and a detent pawl cooperating with said ratchet wheel, a disc member with two pins integral to said ratchet wheel to define an initial position and a final position and adapted to act on said detent pawl, a spring which is loaded by the tripping feed of said ratchet wheel, and adapted to return the device to zero, a ratchet wheel with removable pins controlling the feed pawl, a hydraulically operated pawl to feed by one trip said ratchet wheel provided with removable pins at each stroke of the carriage, said pins acting on said feed pawl to feed the ratchet wheel which operates the eccentric, to increment the position of the toolpost slide each time a pin acts on the feed pawl.

2. A machine according to the claim 1, wherein said control bar includes additional control stops cooperating with said hydraulic distributor device to move it after a desired extent of displacement of said control bar.

3. A screw cutting machine including: a rotary spindle; a chuck secured to the spindle; a leadscrew for the control of the tool carriage; a reversal mechanism to reverse the direction of motion of the leadscrew, including an input shaft, an output shaft, a slidably keyed sleeve on said output shaft, a first single tooth on one end of the sleeve and a second single tooth on the other end of the sleeve a tripping control means to operate the tripping slipping of said sleeve, a gear integral to said input shaft and provided with a single tooth to cooperate with the first single tooth on the sleeve, a free gear on said output shaft and provided with teeth to cooperate with the second single tooth on the sleeve, and a train of gears between said two gears; a train of gears replaceable between said spindle and said input shaft of the reversal mechanism, including gears replaceably mounted on overhanging shafts one of which at least positionally adjustable; a train of replaceable gears located between the output shaft of the reversal mechanism and the leadscrew, including a gear secured to said output shaft, a gear secured to the leadscrew, overhanging shafts and replaceable gears on said overhanging shafts; a carriage with a toolpost slide, slidable on longitudinal ways, and coupled to said leadscrew; a control bar co-extending with said leadscrew, axially slidable and carrying adjustable stops cooperating with said carriage at the end of the stroke, said bar carrying at one end, said tripping control means for said sleeve of the reversal mechanism; a hydraulic distributor device controlled by said control bar to change the fluid feed to one or to the other of two flexible conduits connected to the carriage; on the carriage a hydraulic device for the reciprocal control of the toolpost slide, including a two-members-cylinder-plunger system reciprocally fed by said two conduits, one of said members being integral to the slide and the other being engaged to a rotary tripping eccentric, a tripping displacement device of said eccentric including a ratchet wheel operating said eccentric, a feed pawl and a detent pawl cooperating with said ratchet wheel, a disc member with two pins integral to said ratchet wheel to define an initial position and a final position and adapted to act on said detent pawl, a spring which is loaded by the tripping feed of said ratchet wheel, and adapted to return the device to zero, a ratchet wheel with removable pins controlling the feed pawl, a hydraulically operated pawl to trip and feed by one trip said ratchet wheel provided with removable pins at each stroke of the carriage, said pins acting on said feed pawl to feed the ratchet wheel which operates the eccentric, to increment the position of the toolpost slide each time a pin acts on the feed pawl.

4. A screw cutting machine including: a rotary spindle; a chuck secured to the spindle; a leadscrew for the control of the tool carriage; a reversal mechanism to reverse the direction of motion of the leadscrew, including an input shaft, an output shaft, a slidably keyed sleeve on said output shaft, a first single tooth on one end of the sleeve and a second single tooth on the other end of the sleeve, a pointer on said sleeve cooperating with a movable pointed member to operate the tripping slipping of said sleeve, a gear integral to said input shaft and provided with a single tooth to cooperate with the first single tooth on the sleeve, a free gear on said output shaft and provided with teeth to cooperate with the second single tooth on the sleeve, and a train of gears between said two gears; a train of gears replaceable between said spindle and said input shaft of the reversal mechanism, including at least a pair of gears replaceably mounted on a positionally adjustable overhanging shaft, one of said gears of the pair meshing a replaceable gear operated by the spindle, and the other of said gears of the pair meshing a replaceable gear mounted on said input shaft of the reversal mechanism; a train of replaceable gears located between the output shaft of the reversal mechanism and the leadscrew, including a gear secured to the shaft, a gear secured to the leadscrew, an intermediate shaft, two replaceable gears mounted and spaced on said intermediate shaft, overhanging shafts independently adjusted in position, a replaceable gear on one of said overhanging shafts to mesh said gear on the output shaft of the reversal mechanism and one of said gears on the intermediate shaft, a pair of replaceable gears mounted on the other overhanging shaft meshing said gear on the leadscrew and the other gear on the intermediate shaft; a carriage with a toolpost slide, slidable on longitudinal ways, and coupled to said leadscrew; a control bar co-extending with said leadscrew, axially slidable and carrying adjustable stops cooperating with said carriage at the end of the stroke, said bar forming an end core with a transversal sliding guide for said pointed member; said core being connected with said sleeve of the reversal mechanism through articulated connecting rods, restrictedly movable in the central zone; on the carriage a device for the reciprocal control of a toolpost slide, a rotary tripping eccentric to determine the feed increment of the toolpost slide, a tripping displacement device of said eccentric including a ratchet wheel operating said eccentric, a feed pawl and a detent pawl cooperating with said ratchet wheel, a disc member with two pins integral to said ratchet wheel to define an initial position and a final position and adapted to act on said detent pawl, a spring which is loaded by the tripping feed of said ratchet wheel, and adapted to return the device to zero, a ratchet wheel with removable pins controlling the feed pawl, a pawl responsive to limit stroke in one direction of the carriage to trip and feed by one trip said ratchet wheel provided with removable pins at each stroke of the carriage, said pins acting on said feed pawl to feed the ratchet wheel which operates the eccentric, to increment the position of the toolpost slide each time a pin acts on the feed pawl.

5. A screw cutting machine including: a rotary spindle; a chuck secured to the spindle; a leadscrew for the control of the tool carriage; a reversal mechanism to reverse the direction of motion of the leadscrew, including an input shaft, an output shaft, a slidably keyed sleeve on said output shaft, a first single tooth on one end of the sleeve and a second single tooth on the other end of the sleeve, tripping control means to operate the tripping slipping of said sleeve, a gear integral to said input shaft and provided with a single tooth to cooperate with the first single tooth on the sleeve, a free gear on said output shaft and provided with teeth to cooperate with the second single tooth on the sleeve, and a train of gears between said two gears; a train of gears replaceable between said spindle and said input shaft of the reversal mechanism, including gears replaceably mounted on overhanging shaft one of which at least positionally adjustable; a train of replaceable gears located between the output shaft of the reversal mechanism and the leadscrew, including a gear secured to said output shaft, a gear secured to the leadscrew, overhanging shafts and replaceable gears on said overhanging shafts; a carriage with a toolpost slide, slidable on longitudinal ways, and coupled to said leadscrew; a control bar co-extending with said leadscrew, axially slidable and carrying adjustable stops cooperating with said carriage at the end of the stroke, said bar, carrying at one end, said tripping controls means for said sleeve of the reversal mechanism; on the carriage a device for the reciprocal control of a toolpost slide, a rotary tripping eccentric to determine the feed increment of the toolpost slide, a tripping displacement device of said eccentric including a ratchet wheel operating said eccentric, a feed pawl and a detent pawl cooperating with said ratchet wheel, a disc member with two pins integral to said ratchet wheel to define an initial position and a final position and adapted to act on said detent pawl, a spring which is loaded by the tripping feed of said ratchet wheel, and adapted to return the device to zero, a ratchet wheel with removable pins controlling the feed pawl, a hydraulically operated pawl to trip and feed by one trip said ratchet wheel provided with removable pins at each stroke of the carriage, said pins acting on said feed pawl to feed the ratchet wheel which operates the eccentric, to increment the position of the toolpost slide each time a pin acts on the feed pawl.

6. A screw cutting machine including: a rotary spindle; a chuck secured to the spindle; a leadscrew for the control of the tool carriage; a reversal mechanism to reverse the direction of motion of the leadscrew, involving means to obtain a coupling position at a sole angular meshing; a train of gears replaceable between said spindle and said input shaft of the reversal mechanism, including at least a pair of gears replaceably mounted on a positionally adjustable overhanging shaft, one of said gears of the pair meshing a replaceable gear operated by the spindle, and the other of said gears of the pair meshing a replaceable gear mounted on the input shaft of said reversal mechanism; a train of replaceable gears located between the output shaft of the reversal mechanism and the leadscrew, including a gear secured to the shaft, a gear secured to the leadscrew, an intermediate overhanging shaft, two replaceable gears mounted and spaced on said intermediate shaft, overhanging shafts independently adjusted in position, a replaceable gear on one of said overhanging shafts to mesh said gear on the output shaft of the reversal mechanism and one of said gears on the intermediate shaft, a pair of replaceable gears mounted on the other overhanging shaft meshing said gear on the leadscrew and the other gear on the intermediate shaft; a carriage with a toolpost slide, slidable on longitudinal ways, and coupled to said leadscrew; a control bar co-extending with said leadscrew, axially slidable and carrying adjustable stops cooperating with said carriage at the end of the stroke; means combined with said bar to control said reversal mechanism; on the carriage a device for the reciprocal control of the toolpost slide; a rotary tripping cam to determine the feed increment of the tool, a tripping displacement device of said cam including a ratchet wheel operating said cam, a pawl for the tripping feed of said ratchet wheel, a ratchet wheel with removable pins controlling the feed pawl, a pawl operated at the end of the carriage stroke in one direction, to trip and feed by one trip said ratchet wheel provided with removable pins at each stroke of the carriage, said pins acting on said feed pawl to feed the ratchet wheel which operates the cam to increment the position of the toolpost slide each time a pin acts on the feed pawl.

References Cited in the file of this patent

UNITED STATES PATENTS

| 2,419,639 | Groene | Apr. 29, 1947 |
| 2,808,598 | Mannaioni | Oct. 8, 1957 |

FOREIGN PATENTS

| 510,133 | Belgium | Apr. 15, 1952 |